Sept. 18, 1956 C. M. SCOTT 2,763,709
EMERGENCY TRANSFORMER AND CART THEREFOR
Filed Feb. 19, 1953 2 Sheets-Sheet 1
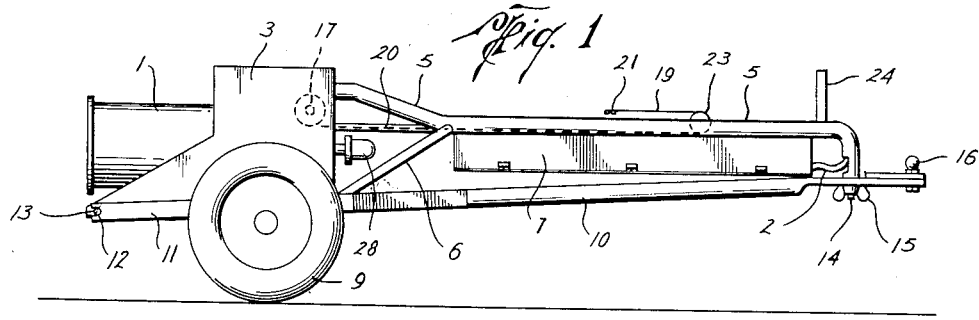
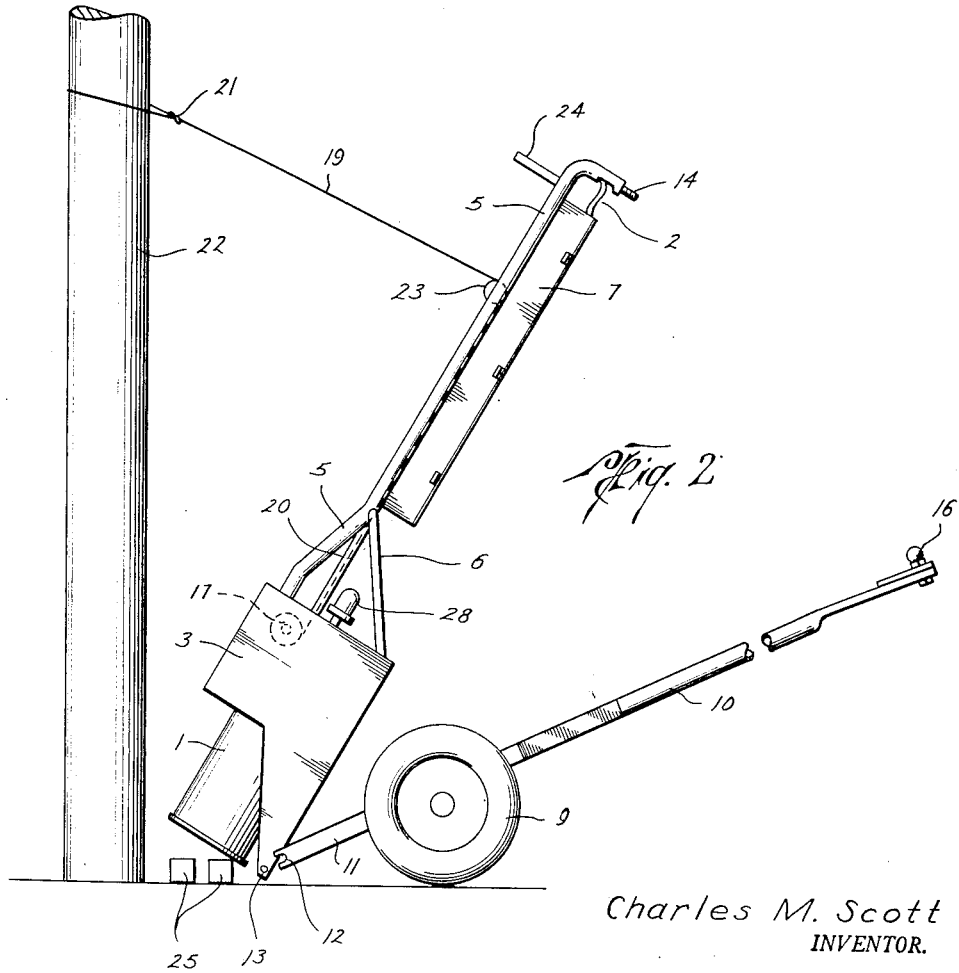
Charles M. Scott
INVENTOR.
BY
ATTORNEY

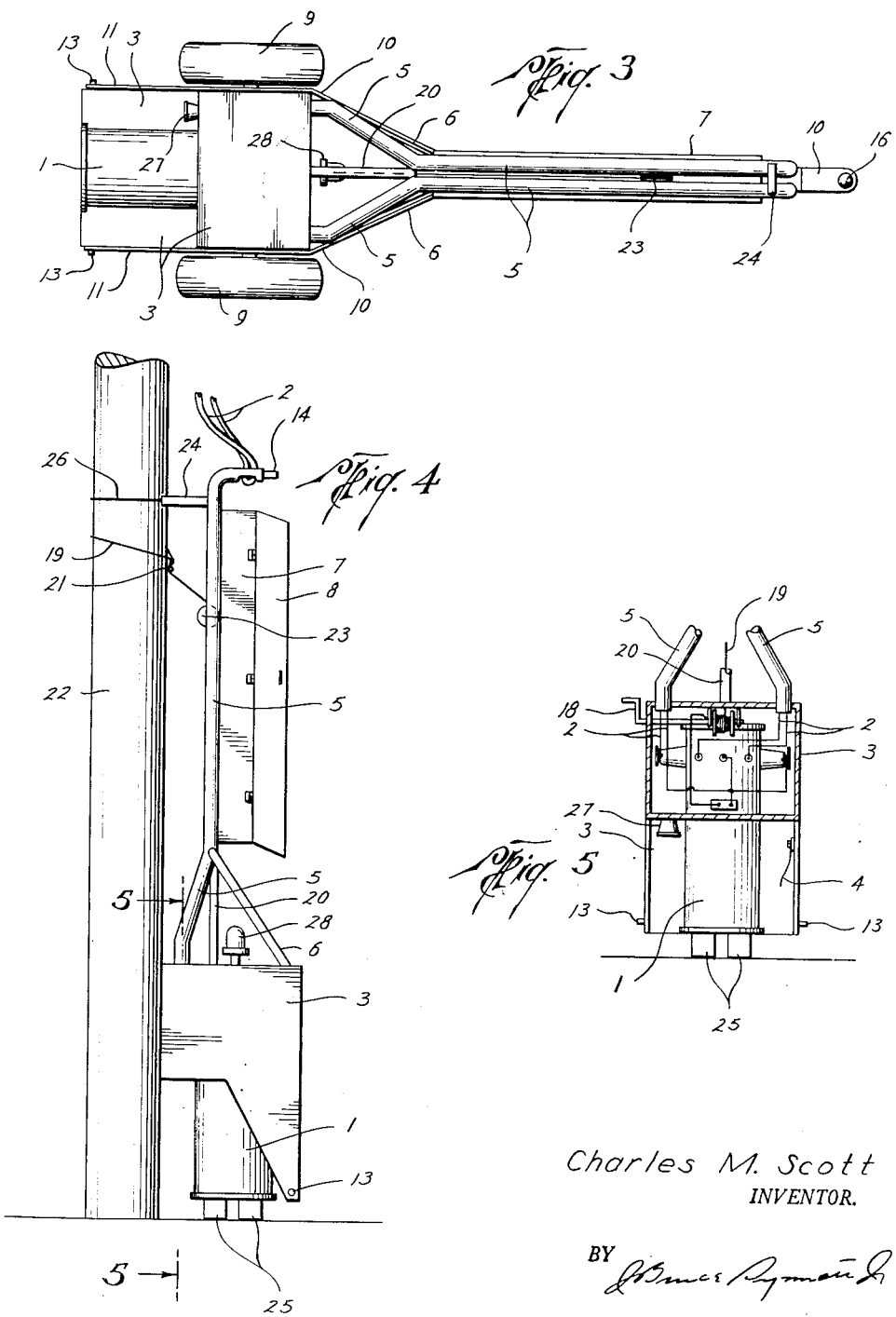

ized by a high degree of mobility and maneuverability, and which may be readily handled by one man notwithstanding the fact that such equipment is necessarily heavy.

United States Patent Office 2,763,709
Patented Sept. 18, 1956

2,763,709

EMERGENCY TRANSFORMER AND CART THEREFOR

Charles M. Scott, Beaumont, Tex.

Application February 19, 1953, Serial No. 337,784

1 Claim. (Cl. 174—65)

The invention concerns an emergency transformer, and a cart therefor, for use in making temporary replacements of transformers used in high voltage power transmission and distribution service.

It is an object of the invention to provide a mobile transformer assembly which may be readily transported to the location where the trouble occurs, and installed, by a one-man crew. A mobile transformer assembly of the type described is particularly desirable for use in isolated, rural areas and in small communities, where large maintenance forces are not immediately available, and for use at night and on Sundays and holidays, when repair work must be paid for at over-time rates.

The invention contemplates a complete, fully enclosed, tamper proof transformer assembly which is characterized by a high degree of mobility and maneuverability, and which may be readily handled by one man notwithstanding the fact that such equipment is necessarily heavy.

The invention will be readily understood by referring to the following description and the accompanying drawing, in which:

Fig. 1 is a side view of a transformer assembly and cart embodying the invention, showing the transformer assembly loaded on the cart.

Fig. 2 is a view in elevation showing the transformer assembly being unloaded from the cart preparatory to attaching it to a pole carrying a power line.

Fig. 3 is a top view of the apparatus shown in Fig. 1.

Fig. 4 is a view in elevation showing the transformer assembly as it appears when installation is complete.

Fig. 5 is a sectional view in elevation, taken on the line 5—5 of Fig. 4.

Referring to Figs. 4 and 5 of the drawing, the numeral 1 designates a transformer, which as shown is generally cylindrical in shape and has a plurality of lead wires 2 connected thereto adjacent its upper end. The transformer 1 may be of a conventional type which is readily available, and preferably has the necessary fuses incorporated therein.

The transformer 1 is partially enclosed by a box-like casing 3, which is rigidly secured thereto. The casing 3 entirely surrounds the upper portion of the transformer 1, whereby it shields the connections for the lead wires 2, and extends downwardly on the front side to the lower end of the transformer 1. A ground wire 4 is connected at one end to the casing 3.

A pair of conduits 5, which partially enclose the lead wires 2, are rigidly secured at one end to the upper end of the casing 3 and extend upwardly therefrom. A pair of braces 6 are rigidly connected at their ends to intermediate portions of the conduits 5 and to the upper end of the casing 3. The lead wires 2 are longer than the conduits 5, and extend beyond the ends thereof. An elongated receptacle for the free ends of the lead wires 2, comprising a narrow box 7 having a hinged cover 8, is disposed parallel to the conduits 5 and rigidly secured thereto.

Referring to Figs. 1 and 3 of the drawing, the transformer assembly above described is disposed horizontally and is mounted on a cart whereby it may be transported to the desired location. The cart includes a pair of wheels 9 which are adapted to support the transformer assembly intermediate its ends, and has a forwardly extending portion 10 and a pair of rearwardly extending side members 11. Notches 12, which are formed in the extreme ends of the rearwardly extending side members 11, engage pins 13 which extend outwardly from opposite sides of the casing 3 adjacent its lower end. The conduits 5 are bent sharply adjacent their upper ends and their upper ends are detachably secured to the forwardly extending portion 10 of the cart by a bolt 14 and a wing nut 15. A trailer hitch 16 is mounted on the extreme end of the forwardly extending portion 10 of the cart.

Referring to Figs. 2, 4 and 5 of the drawing, a winch 17 is mounted inside the casing 3, adjacent the upper end thereof, and is provided with a crank 18 whereby it may be operated manually. A cable 19, which is acted upon by the winch 17, is partially enclosed within a conduit 20, and has a hook 21 on its free end whereby it may be hitched to a pole 22. The conduit 20 is disposed between the conduits 5 and rigidly secured at one end to the upper end of the casing 3. An intermediate portion of the cable 19 engages a pulley 23, which is mounted on the conduits 5 intermediate their ends, whereby the conduits 5, as well as the remainder of the transformer assembly, are lifted to vertical position adjacent the pole 22 upon manipulation of the winch 17.

An abutment 24 is rigidly secured to the upper ends of the conduits 5 and engages the pole 22 when the transformer assembly is in vertical position. As shown in Fig. 4, the lower end of the transformer 1 rests upon boards, indicated by the numeral 25, and the upper ends of the conduits 5 are anchored to the pole 22 by a chain 26, which is detachably connected to the abutment 24.

A tail light 27 is mounted on the rear end of the casing 3, as shown in Fig. 3, and a flashing light 28, which serves as a warning signal, is mounted on the upper end of the casing 3.

The invention may be modified in various ways without departing from the spirit and scope thereof.

I claim:

In combination with a transformer having a cylindrical shell and a plurality of electrical terminals extending outwardly from the shell for engagement by lead wires, a plurality of lead wires connected to the terminals, a casing at least partially enclosing the transformer and rigidly secured to the shell whereby the casing shields the lead wire connections, conduit means for the lead wires comprising a pair of elongated tubular members each disposed parallel to the axis of the shell and rigidly connected at one end to the casing, and means for elevating the assembly to vertical position comprising a hand operable winch enclosed within the casing, a cable acted upon by the winch and having a hook on its free end whereby it may be hitched to a pole, and a pulley mounted on the tubular members above the winch, the cable acting upon the pulley to lift the tubular members upon manipulation of the winch.

References Cited in the file of this patent

UNITED STATES PATENTS

| 1,005,307 | Randall | Oct. 10, 1911 |
| 1,574,064 | Chamberlain | Feb. 23, 1926 |
| 1,620,411 | Temple | Mar. 8, 1927 |
| 2,394,329 | Pittman | Feb. 5, 1946 |

FOREIGN PATENTS

| 249,524 | Great Britain | Jan. 6, 1927 |
| 869,979 | France | Nov. 27, 1941 |